(12) United States Patent
Kavallierou (10) Patent No.: US 11,325,031 B2
(45) Date of Patent: May 10, 2022

(54) METHOD OF AND SYSTEM FOR CONTROLLING THE RENDERING OF A VIDEO GAME INSTANCE

(71) Applicant: Sony Interactive Entertainment Inc., Tokyo (JP)

(72) Inventor: Michael Adam Kavallierou, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/860,207

(22) Filed: Apr. 28, 2020

(65) Prior Publication Data

US 2020/0346109 A1 Nov. 5, 2020

(30) Foreign Application Priority Data

May 2, 2019 (GB) .................................... 1906158

(51) Int. Cl.
*A63F 13/352* (2014.01)
*A63F 13/358* (2014.01)
*A63F 13/48* (2014.01)

(52) U.S. Cl.
CPC .......... *A63F 13/352* (2014.09); *A63F 13/358* (2014.09); *A63F 13/48* (2014.09)

(58) Field of Classification Search
CPC .......... A63F 13/20; A63F 13/25; A63F 13/30; A63F 13/32; A63F 13/327; A63F 13/33; A63F 13/332; A63F 13/335; A63F 13/35; A63F 13/352; A63F 13/355; A63F 13/358; A63F 13/40; A63F 13/45; A63F 13/70; A63F 2300/534
See application file for complete search history.

(56) References Cited

U.S. PATENT DOCUMENTS

2014/0309039 A1* 10/2014 Yoshida ................ G06F 9/5027
463/42
2015/0062163 A1 3/2015 Lee
(Continued)

FOREIGN PATENT DOCUMENTS

WO 2016014718 A1 1/2016

OTHER PUBLICATIONS

Extended Examination Report for corresponding EP Application No. 20169649.9, 10 pages, dated Sep. 25, 2020.
(Continued)

*Primary Examiner* — Omkar A Deodhar
(74) *Attorney, Agent, or Firm* — Matthew B. Dernier, Esq.

(57) ABSTRACT

Methods and apparatus for controlling the rendering of a video game instance includes obtaining game state information and player inputs from a plurality of client devices participating in a video game session. Based on the obtained game state information, a client device is identified as being likely to render a video game instance with a quality that is less than a threshold quality. A cloud game client is allocated to the identified client device. The player inputs associated with the identified client device and the obtained game state information are provided to the cloud game client, which renders the video game instance for the identified client device. The video game instance rendered at the cloud device is then transmitted to the identified client device for display at an associated display.

16 Claims, 5 Drawing Sheets

(56) References Cited

U.S. PATENT DOCUMENTS

| | | |
|---|---|---|
| 2015/0174484 A1 | 6/2015 | Omi |
| 2016/0059125 A1* | 3/2016 | Georgiev .............. G06F 9/5027 463/31 |
| 2016/0246370 A1 | 8/2016 | Osman |
| 2016/0364910 A1 | 12/2016 | Andrew |
| 2017/0072323 A1 | 3/2017 | Malenfant |
| 2018/0181199 A1 | 6/2018 | Harvey |
| 2021/0001234 A1* | 1/2021 | Shoji ....................... A63F 13/58 |

OTHER PUBLICATIONS

Extended Examination Report for corresponding EP Application No. 20169649.9, 8 pages, dated Sep. 25, 2020.
Combined Search and Examination Report for corresponding GB Application No. 1906158.9, 3 pages, dated Sep. 26, 2019.

* cited by examiner

METHOD OF AND SYSTEM FOR CONTROLLING THE RENDERING OF A VIDEO GAME INSTANCE

BACKGROUND OF THE INVENTION

Field of the Invention

The present disclosure relates to a method and system for controlling the rendering of a video game instance.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In typical multiplayer video games, players play against each other in virtual environments of constrained size. In certain games, such as team multiplayer games, the locations at which players enter the environment is usually controlled by the game. These locations are typically set so as to drive the game's story or goal for the gameplay and may be chosen such that the locations of players are sufficiently spread across the map. This may ensure, for example, that players are given adequate time to establish themselves in the environment, before engaging with other players. Spreading the players in this way also has the benefit of avoiding high local load on a games console, i.e. by avoiding the need to calculate and display multiple players within a given area of the map.

In other multiplayer video games, the virtual environment may correspond to an open world type environment. For these video games, players may be able to choose where on the map they start or enter from. An example of such a game is Fortnite®, which allows players to sky dive from a vehicle that traverses across the map of the environment. During skydiving, the player can adjust their landing position by using the controller. Typically, entering the map in this manner results in hot spots of activity, i.e. popular places to drop. Consequently, this can result in certain areas of the environment becoming overwhelmed with players.

When large numbers of players occupy the same area of a virtual environment, this can place an additional load on the game console. For example, there may be an increased load on the GPU as a result of the games console having to perform an accurate render for each player model and its position on screen.

Moreover, there may be an increased CPU load, as a result of the additional CPU operations that need to be performed. These CPU operations may include e.g. performing animation calculations for each player model, to ensure that an accurate render of each player model and its position on screen can be achieved. Animation interpolation needs to be performed by the CPU should a player be visible, and in the case of a high density of players there is a corresponding higher processing requirement for all of these players to be animated correctly according to the view, which places higher load on the CPU device.

For online video games, a high density of players in close (virtual) proximity may also place an additional load on the network traffic, and any network calculations associated therewith. The network traffic may include e.g. the locations of the players within the virtual environment. As will be appreciated, this data will need to be sent accurately to the participating client devices, to ensure that each player has the most up to date view of the shared virtual environment. Moreover, client-side prediction and interpolation events will need to be processed as soon as possible, and any delay in the receipt of data relevant for these events (sent over the network) will result in a sub-optimal experience for the player.

Typically, video game designers accept that there will be situations in which an area of a virtual environment, occupied by multiple concurrently playing players, cannot be rendered at a desired accuracy. In such situations, this may result in the video game being rendered at a lower frame rate—in some cases, to almost unplayable levels. Other mitigations include removing some of the visual display, reducing player models, and/or reducing the environment level of detail, to try to improve the frame rate at the cost of visual fidelity. As will be appreciated, any of these mitigations result in a player being presented with a sub-optimal view of the environment and a corresponding reduction in immersion.

Clearly, it would be desirable if each player concurrently occupying a region of a virtual environment could be presented with a respective view of the environment, where the frame rate and or visual fidelity of that view had not been compromised in some way. The present invention seeks to address or at least alleviate this problem.

SUMMARY OF THE INVENTION

According to a first aspect disclosed herein, there is provided a method accordance in claim 1.

According to a second aspect disclosed herein, there is provided a method in accordance with claim 9.

According to a third aspect disclosed herein, there is provided an entertainment device in accordance with claim 16.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
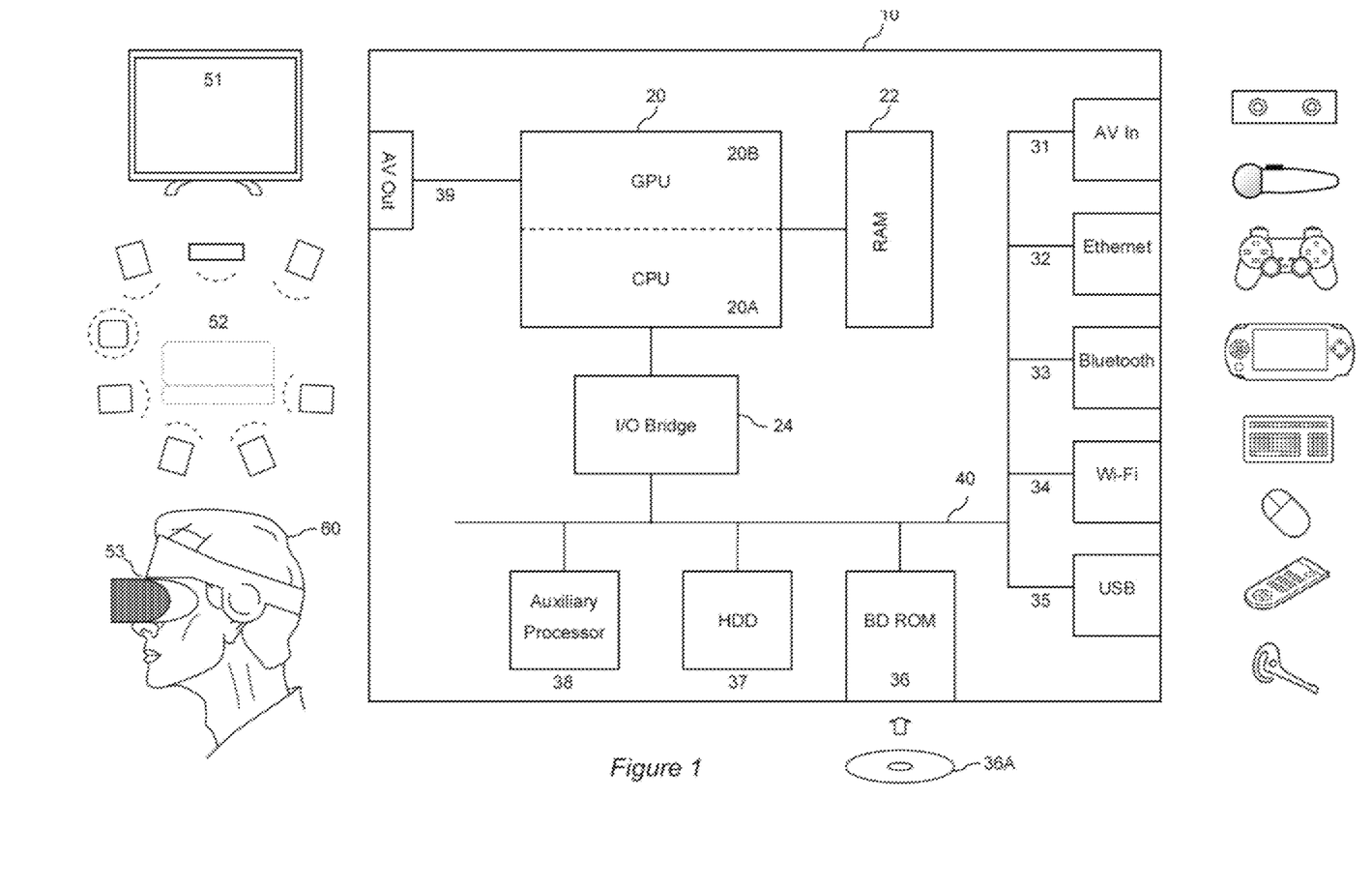
FIG. 1 shows schematically an example of a video games console.

Referring now to the drawings, wherein like reference numerals designate identical or corresponding parts throughout the several views, FIG. 1 schematically illustrates the overall system architecture of a video games console. In FIG. 1, the games console corresponds to a Sony® PlayStation 4® entertainment device. A system unit 10 is provided, with various peripheral devices connectable to the system unit. The system unit 10 comprises an accelerated processing unit (APU) 20 being a single chip that in turn comprises a central processing unit (CPU) 20A and a graphics processing unit (GPU) 20B. The APU 20 has access to a random-access memory (RAM) unit 22. The APU 20 communicates with a bus 40, optionally via an I/O bridge 24, which may be a discrete component or part of the APU 20. In some examples, the entertainment device may further comprise a tensor processor unit (TPU) (not shown).

Connected to the bus 40 are data storage components such as a hard disk drive 37, and a Blu-ray® drive 36 operable to access data on compatible optical discs 36A. Additionally the RAM unit 22 may communicate with the bus 40. Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI port.

The peripheral devices may include a monoscopic or stereoscopic video camera 41 such as the PlayStation Eye®; wand-style videogame controllers 42 such as the PlayStation Move® and conventional handheld videogame controllers 43 such as the DualShock 4 ®; portable entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, generates video images and audio 15 for output via the AV output 39. Optionally the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

In operation, the entertainment device defaults to an operating system such as a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features 25 and to select games and optionally other content.

The video games console shown in FIG. 1 is just one example of a video game playing device at which computer program instructions corresponding to a video game may be executed. It will be appreciated that other types of video game playing device are not excluded. In the present disclosure, any computing device that is capable of receiving player inputs (directly or indirectly) and generating a video signal (corresponding to a video game instance) for output at a display, is considered as a video game playing device. A video game playing device may include, for example, a personal computer (PC), smartphone, laptop, tablet, smart TV, set-top box, portable gaming device, games controller, etc.

In the present disclosure, each video game playing device comprises a CPU and/or GPU for rendering instances of a video game. Here, the term video game instance refers to a respective player's view of a virtual environment that is provided by a video game. As will be appreciated, a player's view of the virtual environment will depend on actions performed by the player, as well as events occurring within the virtual environment and actions performed by other players (real or NPCs). In online multiplayer video games, each player may have a different respective view of the virtual environment.

In the present disclosure, each video game playing device provides a respective participant of a video game session with access to an online multiplayer game. For this reason, each computing device is referred to as a client device. The video game session may correspond to e.g. a sports or combat match, such as a battle-royale mode combat match. Each client device is in communication with a central game server, via a communications network. The game server receives and processes each player's input and generates an authoritative source of events occurring within the video game. The game server transmits data about its internal state to the connected client devices, enabling each client device to maintain their own accurate version of the virtual world for display to a corresponding player. In this way, each player is able to concurrently populate a common virtual environment.

The client devices described herein are also able to access a cloud gaming service that is made available by one or more servers, via a communications network. Video game instances rendered at the client devices are said to be rendered locally, whereas video game instances rendered using the cloud game service are said to have been rendered remotely.

As mentioned previously, for online multiplayer games, rendering video game instances at respective client devices can result in a dropin frame rate and or visual fidelity when there is a high density of players within a given region of a virtual environment. As the density of players within a given region increases, there is a corresponding increase in the number of players and associated events that need to be rendered for a player in that region. In turn, this can result in an excessive load being placed on the CPU and or GPU of the client device for a player operating within that region.

Moreover, as the density of players in a given region increases, network traffic associated with the online video game session may also increase. This may occur as a result of e.g. more in-game events occurring as more players come into interaction with one another. As described previously, excessive network traffic is undesirable since it may lead to a lag in the updating of the virtual environment for a given player.

Client-side prediction is a commonly used technique in multiplayer network games and is used to improve latency of gameplay by predicting movement on the game client, and monitoring this prediction, and adjusting as necessary against server information. Examples of client-side prediction techniques are publicly available, for example, at https://en.wikipedia.org/wiki/Client-side_prediction. However, typically these techniques fail to consider that, as the player density increases, the scope for processing client or server adjustment increases. For example, usually, a client device will predict the motion of other remote players appearing in a local player's view of the environment, based on updates received from the game server. If the updates received from the server correspond with the predicted movement, then no adjustments are made to the display of the other players. However, in some cases, it may be that the display of one or more players needs to be adjusted, based on a discrepancy between what was predicted for those players (at the client) and the updated information received from the server. As the density of remote players within the vicinity of the local player increases, there is a corresponding increase in the amount of prediction and adjustment that needs to be performed at the client device. Any delays caused by this additional prediction and adjustment can result in the other players appearing to jump between animation or locations. Clearly, the display of the other players in this manner is undesirable and results in a less immersive experience for the local player.

Figure 2:
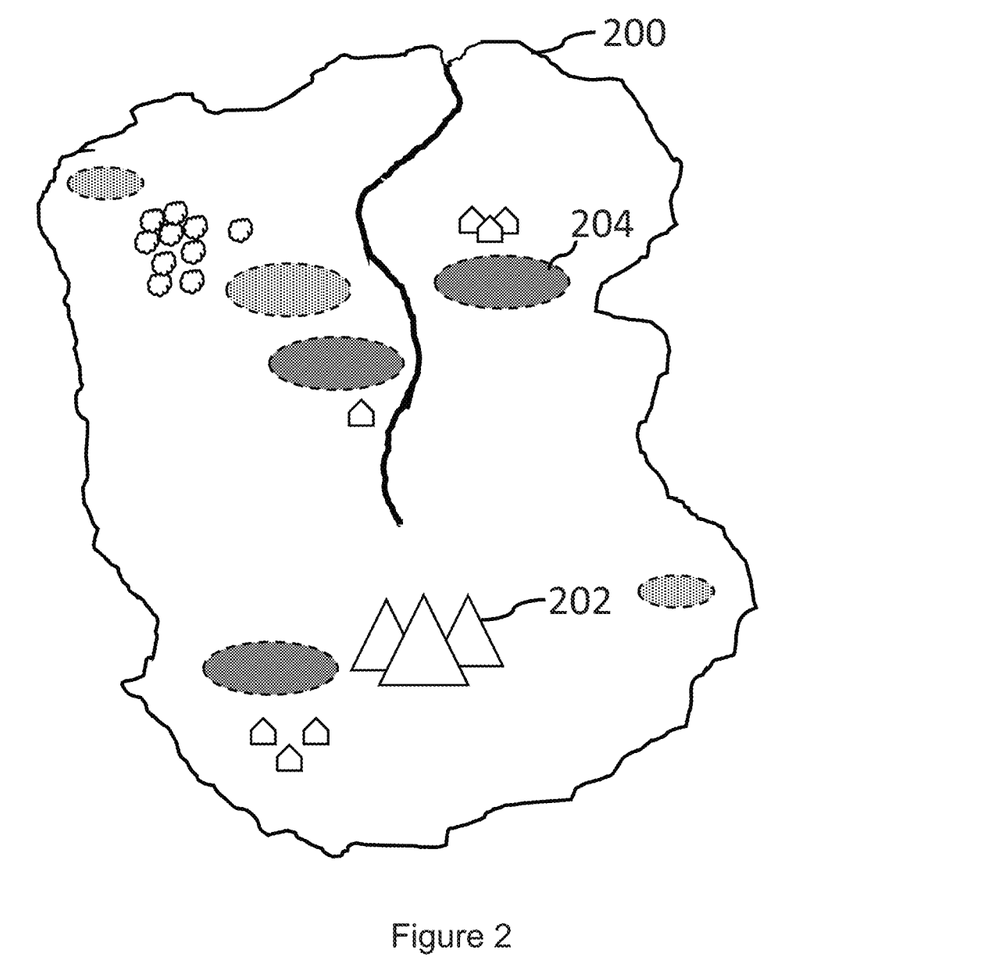
FIG. 2 shows schematically an example of a map of a virtual environment and locations of hot-spots of activity on the map.
Figure 3:
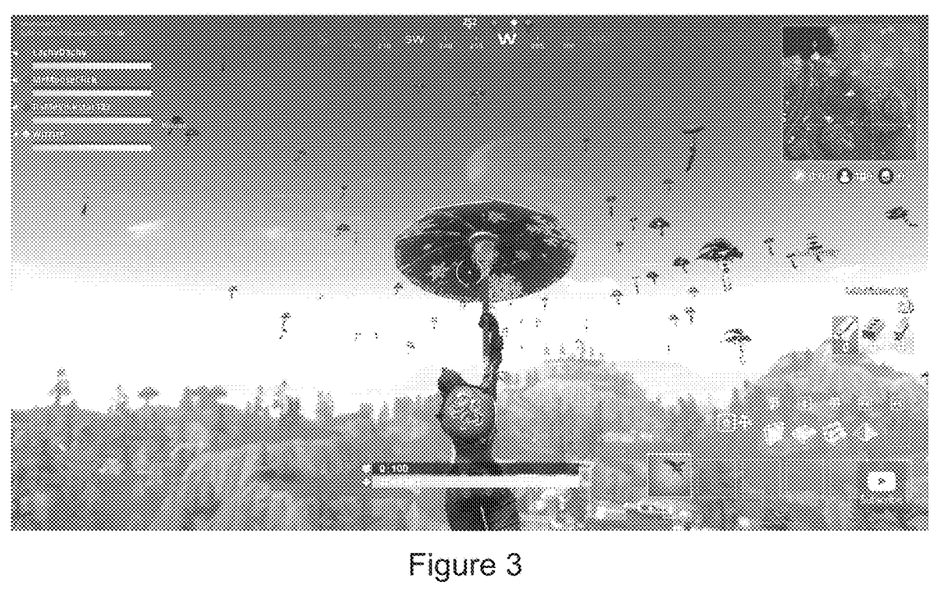
FIG. 3 shows a screenshot of a player dropping into a virtual environment.

FIG. 2 shows schematically an example of a map of an open world of an online multiplayer video game. In FIG. 2, the map is shown as comprising a river, trees, buildings and mountains 202. The map may correspond to the Fortnite® map and players may be able to control where they enter the map from by skydiving from a vehicle that traverses across the map. FIG. 3 shows an example of a plurality of players entering the virtual environment from similar locations.

Allowing players to control their starting position often leads to hot spots of activity, i.e. popular places for players to enter or begin playing from within the virtual environment. An example of these hot spots is shown in FIG. 2 by shaded regions 204. The hot spot regions may correspond to areas of the map where there is more cover, provided by e.g. buildings, trees, rocky terrain, etc. It may also be that players know that certain desirable in-game items are more likely to be found in certain regions and so players may flock to these regions when starting the video game session. As mentioned above, high densities of players within a given region of the virtual environment can result in excessive load being placed on the GPU and or CPU of the client devices associated with those players.

In some video games, there are game modes that further exacerbate the problem of large numbers of players entering the virtual environment at similar locations. For example, Fortnite® provides 'Large Team Modes' where up to 50 players can join a respective team. In such a mode, the players on a given team are typically dropped into the map at similar locations, thus increasing the density of players within that region of the virtual environment. Fortnite® also provides a mode in which the size of the playable map shrinks as time progresses, thus forcing players into closer contact with another. Again, this can result in a high density of players occupying a given region of the virtual environment.

Figure 4:
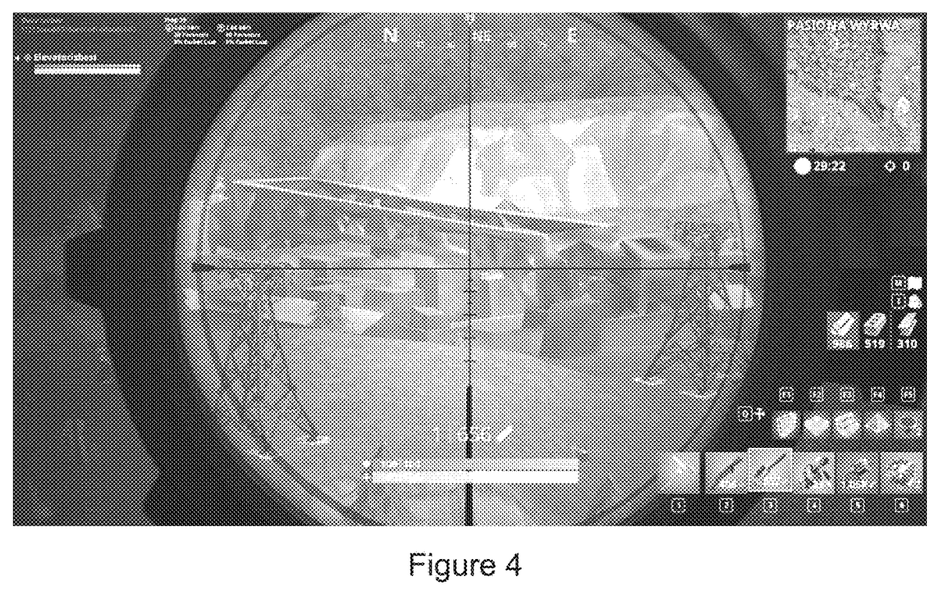
FIG. 4 shows a screenshot of a virtual environment for which a level of visual detail has been reduced.

As mentioned previously, the increase in density of multiple concurrent players operating within a given region of a virtual environment can result in a reduction of the framerate and/or visual fidelity of the video that is rendered for those players. An example of how the visual fidelity may be reduced for a given player is shown in FIG. 4. In FIG. 4, it can be seen that the level of detail has been reduced for a region of the virtual environment that a player has zoomed in on with their sniper rifle. This region may correspond to an area that is populated by multiple concurrently playing players. Alternatively or in addition, it may be that the level of detail shown in FIG. 4 has been reduced because that region is relatively far from the player, and the player's client device has inadequate information for rendering that part of the environment with more detail.

In any case, it would be desirable if this compromise in visual fidelity and/or frame rate could be avoided, with the video displayed to each player corresponding to an accurate rendering of the virtual environment and other players concurrently populating the virtual environment. A method for obtaining such a video will now be described in relation to FIG. 5.

Figure 5:
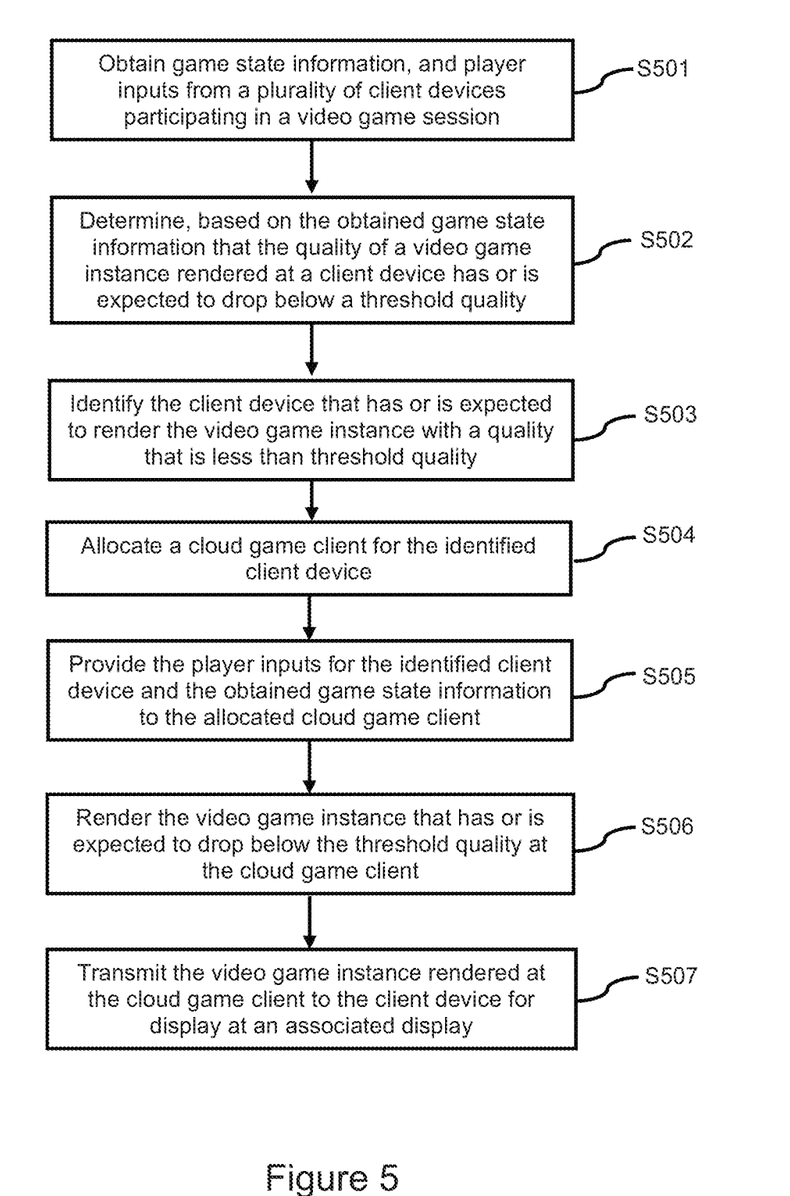
FIG. 5 shows an example of a method for controlling the rendering of a video game instance in accordance with the present disclosure.

At a first step S501, player inputs and game state information from a plurality of client devices participating in a video game session is obtained. The player inputs may correspond to e.g. controller inputs received at a controller device that each participant is using to control a respective avatar within a shared virtual environment. The game state information may include player state information such as e.g. the location of a respective player in the shared virtual environment, a game mode associated with a respective player (e.g. team mode), an identity associated with a respective player, the identities of other players on the same team as that player, etc. The game state information may also include information about the state of the virtual environment, such as e.g. a game mode (e.g. map shrinking), physics calculations that are to be performed, etc. The player inputs and game state information may be received at e.g. a game server from the respective client devices, via a communications network.

At a second step S502, it is determined, based on the obtained game state information that at least one of the client devices participating in the video game session is likely to render a video game instance with a quality that is less than a threshold quality. In preferred examples, the obtained game state information provides an indication of a density of players concurrently populating a region of the shared virtual environment. Thus, step S502 may involve determining, based on the locations and game modes associated with one or more players, that the quality of the video game instances rendered for those players (at their respective client devices) is likely to drop below a threshold quality. In this way, step S502 comprises predicting, based on the obtained game state information, whether at least one of the CPU usage, GPU usage and network traffic associated with one or more players is likely to negatively impact their experience of the video game session. The threshold quality may correspond to e.g. a predetermined frame rate, visual fidelity, etc.

Step S502 may be performed at, for example, a central server that the client device is in communication with via a communications network. The central server may correspond to the game server described previously but programmed to perform at least some of the present method.

Alternatively, step S502 may be performed at a separate server (e.g. a monitoring server) forming part of the cloud gaming service, that is in communication with the client device and the game server. The monitoring server may be configured to instruct a cloud device to commence rendering of a video game instance, based on the obtained game state information, and to instruct the client device to switch to a second mode, in which video rendered by the cloud device is received and output for display. In some examples, step S502 may be performed by both the game server and monitoring server, with the game server instructing the client device as to when to switch to a second mode and the monitoring server ensuring that the video game instance is rendered at a cloud device, as soon as required.

Alternatively or in addition, step S502 may be performed at the client device. For example, the client device may receive the game state information from e.g. the game server in the usual manner, and determine, based on the obtained game state information that the quality of video rendered at the client device has or is likely to drop below the threshold quality.

In some examples, step S502 may be performed less frequently, in response to an initial determination that a given client device is unable to render its video game instance with a sufficiently high render quality (e.g. following a hysteresis once rendering is switched to the cloud). Again, this checking of the render quality may be performed at one or more of a central server, separate monitoring server, or even the client device.

At a third step S503, the at least one client device that is determined as being likely to render the video game instance at a quality that is less than a threshold quality, is identified. This identification may be performed based on a client identifier. For example, each client device may transmit a client identifier to a game server, in order to establish a video game session between those client devices. At step S503, the at least one client device may be identified based on its associated client identifier. There may be a first step of determining which, if any, of the client devices are likely to render a respective video game instance at a quality that is less than a threshold quality, and then storing a client identifier associated with those client devices, for later use, as will be described below.

Step S503 may be performed at e.g. the game server or a monitoring server that is responsible for receiving data from the game server and determining which, if any of the client devices, would benefit from having their respective video game instance rendered by a cloud game client.

Alternatively, or in addition, a client device may be responsible for receiving the obtained game state information and identifying itself as being likely to be unable to render a video game instance with a sufficient render quality. In such examples, the client device may inform e.g. the game server and or a monitoring server that it would benefit from outsourcing at least some of the rendering to a cloud device.

At a fourth step S504, a cloud game client (CGC) is allocated to the identified client device. The cloud game client may correspond to a duplicate of a video game client implemented at the client devices. The cloud game client may comprise a pool of an instance of hardware available on the network (forming part of 'the cloud') having more powerful CPU and GPU capabilities than the client device. Hence, allocating the cloud game client may involve identifying one or more cloud devices (forming the cloud gaming service) having greater CPU and or GPU resources available for rendering the video game instance than the client device(s) identified at step S503. The cloud game client may be already installed at the identified cloud devices, which simply wait to receive the synchronization status of a given player, so that a corresponding view of the virtual environment can be rendered for that player.

The cloud game client may be configured to create a gameplay session for those game clients that are about to experience a low frame rate (or visual fidelity) experience. Hence, at a fifth step S505, the method may comprise providing the player inputs from the at least one identified client device and the obtained game state information, to the cloud game client. The player inputs and the obtained game state information may be provided from e.g. the game server to the one or more cloud devices at which the cloud game client is being implemented. In some examples, the obtained game state information may be provided to cloud game client from the game server, and the player inputs provided directly to the cloud game client from the client device.

At step S506, the method comprises rendering, based on the obtained game state information and player inputs provided to the cloud game client, the video game instance for the identified client device. This rendering may involve generating a video stream for outputting at a display associated with the identified client device. The video stream may correspond to a respective view of the virtual environment for the player associated with the identified client device.

At step S507, the method comprises transmitting the video game instance rendered by the cloud game client to the corresponding (identified) client device. The video game instance, in the form a video stream, may be transmitted to the client device via the communications network. The method may further comprise displaying the received video stream at a display associated with the client device. In some examples, the client device may include an integrated display and the received video stream may be displayed at this display. In other examples, the client device may be connected, e.g. via a wired or wireless connection, to a separate display. In such examples, the client device may be operable to cause the video stream received from the cloud game client to be displayed at the display, instead of the corresponding video generated at the client device.

In some examples, the method may comprise ceasing rendering the video game instance rendered at the at least one identified client device, in response to receiving the video game instance rendered by the cloud game client. For example, the cloud game client may be configured to instruct the at least one identified client device to cease generating the video output, for the player. The player inputs received at the least one client device may be provided by the client device to the cloud game client, for processing at the cloud game client instead of at the client device. This may ensure that e.g. the CPU of the client device is freed up for other operations. In some examples, the client device may simply cease rendering the video game instance if any video is received from the cloud game client.

The method may also comprise obtaining, via the communications network, updated game state information. That is, the method may comprise continuously monitoring the game state information and determining which, if any, of the client devices are likely to benefit from having their respective video game instances rendered by a cloud game client. For client devices that were previously identified as needing a cloud game client (and having their respective video game instances rendered at the cloud game client), it may be determined, based on the updated game state information, that the quality of video game instances rendered at those client devices will no longer be below the threshold quality. This may correspond to detecting e.g. that the density of players within a given player's vicinity (or viewing frustum) has dropped below a threshold value, or that a player or game mode associated with a given player is no longer applicable.

Determining that an identified client device is no longer likely to render its video game instance at a quality that is below the threshold quality may be determined by one or more of the game server, monitoring server, or the identified client device. In the latter case, it may be that the identified client device is able to determine this based on game state information obtained from the game server.

In response to such a determination, the corresponding video game instances may no longer be rendered at the cloud game client. This may involve, for example, transmitting an instruction to the identified client devices, instructing them to revert to rendering their own respective video game instances. Alternatively, the client devices may be configured to switch to local rendering if video has not been received from the cloud game client within a pre-determined time interval. In some examples, it may be that client devices continue rendering their own video game instances, but at a lower quality, whilst the video game instances are being rendered at the cloud game client. Whilst this may appear counterintuitive, it has the benefit of updating environment model data, textures and game assets relevant to the current state of play in the client device in a manner that is transparent to the game, as play progresses in the cloud instance, so that there is not any additional rendering delay caused by needing to newly access game assets locally when the switch back to local rendering is made. It also means that in principle a locally rendered image could substitute for a cloud originating image in the event that there is a streaming interruption. Optionally the locally rendering pipeline could be truncated, e.g. before issuing drawing lists to the GPU, or potentially earlier in the process, once the benefits of maintaining current game assets has been achieved. In response to a determination that the cloud game client need no longer render those video game instances, the client devices may revert to rendering the video game instances at a higher quality (e.g. higher resolution).

As mentioned above, in some examples, the client devices may be operable to determine whether or not cloud-based rendering of their video game instances is needed. In such examples, each client device may report their status to the monitoring server, which based thereon, determines whether the video game instance is to be rendered by the cloud game client. In response to receiving an indication that the render quality is no longer likely to be below the threshold quality, the monitoring server may instruct the corresponding cloud game client to cease rendering those video game instances.

In other examples, this determination may be made at e.g. the game server and/or monitoring server, which may then instruct the client device to switch back to a first mode in which the video game instance is rendered locally.

By no longer rendering a video game instance at the cloud game client, the cloud game client may be used to render video game instances for other client devices identified as being likely to render their respective video game instances at an undesirable render quality. In examples where multiple cloud game clients are created, it may be that, in response to determining that a client device no longer needs its respective cloud game client, the cloud game client for a given client is returned to the pool of available cloud game clients for use by another client device.

In some examples, a computer readable medium having computer executable instructions may be adapted to cause a computer system to perform the method steps described above.

In preferred examples, at least some of the method steps are implemented by a monitoring unit that determines whether, and for whom, a cloud game client is to be used for rendering the video game instances of a video game session. The monitoring unit may correspond to software that is installed at a game server or at a separate monitoring server, as described above. In alternative examples, the functionality of the monitoring unit may be located at the client device.

Generally, the functionality of the monitoring unit may be located at any of the game server, monitoring server and client device. In some examples, this functionality may be shared by or split between any two or all three of these. For example, the client devices may be responsible for determining when the render quality is likely to drop below the threshold quality and informing the game server and/or monitoring server accordingly. The game server and/or monitoring server may then control which, if any, of the video game instances are to be rendered by a cloud game client and ensure that these video game instances are transmitted to the corresponding client devices.

An example of a cloud gaming system for implementing the above described method will now be described in relation to FIG. 6.

Figure 6:
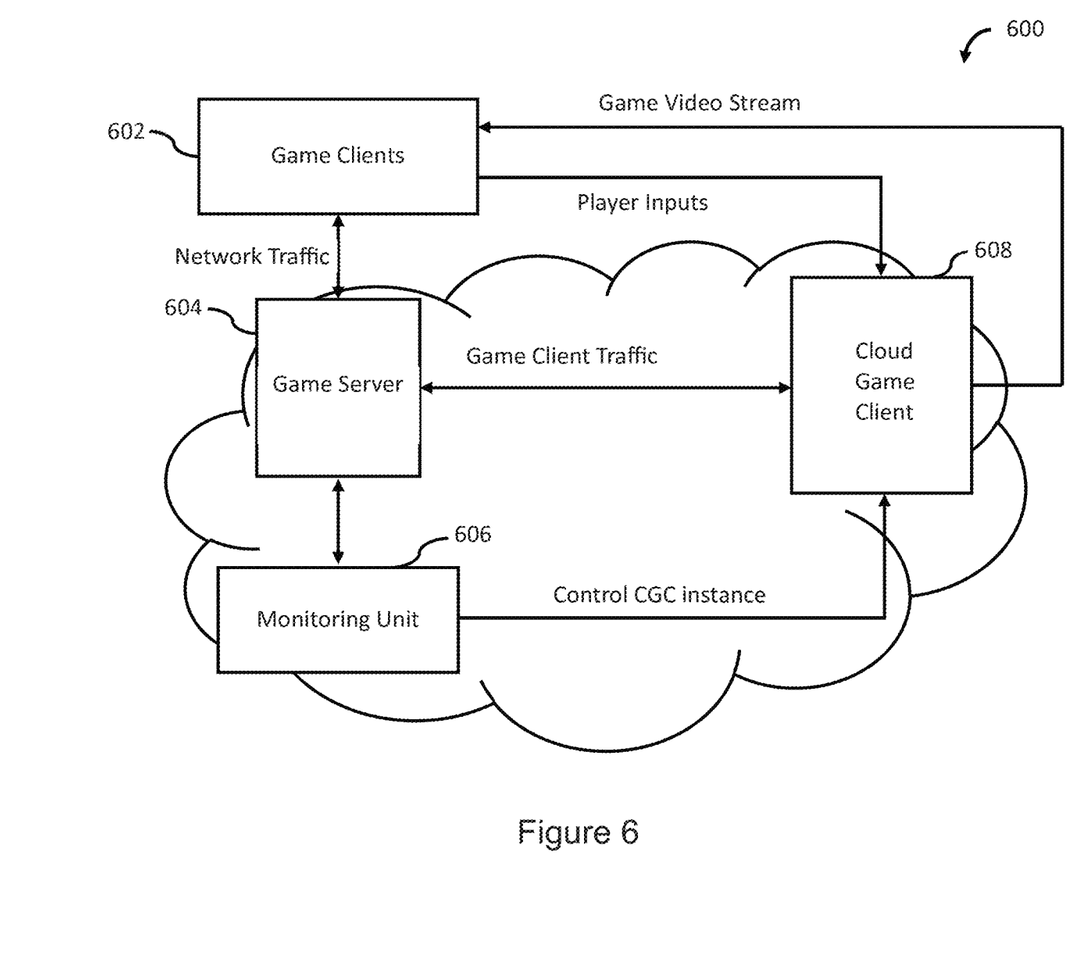
FIG. 6 shows schematically an example of a system for controlling the rendering of a video game instance at a display.

FIG. 6 shows schematically an example of a cloud gaming system 600 for controlling the rendering of a video game instance. The cloud gaming system 600 comprises a plurality of client devices (referred to as 'game clients') 602, each being operable to run a video game client and render a video game instance of a respective video game. Each client device 602 is associated with a respective participant of an online video game session that is facilitated via the cloud gaming system 600 shown in FIG. 6. As described previously, the client devices 602 are operable to generate a video output, corresponding to a player's view of a virtual environment. The client devices 602 may comprise or be connected to a display (not shown) that is operable to display the video generated by the client device.

The cloud gaming system 600 also comprises a games unit operable to receive, via a communications network, player inputs and game state information from the client devices 602 participating in a video game session. In FIG. 6, the games unit corresponds to a game server 604. The communications network may correspond to, for example, a wide-area network (WAN) such as the Internet. The games unit keeps track of events occurring within the video game session and maintains an authoritative version of a shared virtual environment. The client devices 602 are configured to render a respective view of the virtual environment based on information received from the games unit. In FIG. 6, this information is referred to as network traffic and may include e.g. locations of players in the virtual environment, geometry of the virtual environment (e.g. meshes, shader objects, textures), actions and inputs from players, etc.

The system 600 also comprises a monitoring unit 606 operable to receive game state information for the video game session and, based thereon, identify one or more client devices 602 as being likely to render video game instances with a quality that is less than a threshold quality. In FIG. 6, the monitoring unit 606 is shown as a separate monitoring unit 606, however in some examples, the monitoring unit 606 may comprise a software module installed at the game server 604, or optionally as part of a supervisory control unit of the cloud gaming service (not shown), for allocating cloud game clients. The monitoring unit 606 may correspond to a monitoring server that is in communication with the game server 604 via the communications network.

As described previously, the game state information provides information indicative of a density of players concurrently occupying or likely to occupy a region of the virtual environment, and includes a status of the players participating in the video game session (e.g. location in virtual environment, team mode) and a status of the virtual environment (e.g. map shrinking) This information enables the monitoring unit 606 to predict whether the game requirements for a given player are likely to exceed the e.g. GPU and CPU capabilities of that player's client device.

The games unit (e.g. games server 604) is configured to receive an input from the monitoring unit 606, and in response thereto, provide the game state information received from the identified client devices 602 to a cloud game client. In some examples, the games unit also provides the player inputs received from the game clients to the cloud game client. However, in other examples, the identified client devices 602 may be instructed to send the associated player inputs directly to the cloud game client 608 for processing. This instruction may be sent to the client devices 602 from the monitoring unit 606 (optionally, via the games unit).

The games unit may be configured to allocate a cloud game client 608 to the identified client devices 602, or may instruct a supervisory control unit of the cloud game service to do so. As mentioned previously, the cloud game client 608 corresponds to a duplicate of the video game client implemented at the client devices 602. The cloud game client 608 is operable to receive player inputs and game state information for one or more players, and based thereon, render a view of the virtual environment for those players.

In FIG. 6, the cloud game client 608 is shown as a separate unit to the game server 604 and monitoring unit 606. The cloud game client 608 may correspond to code that is implemented at one or more cloud devices such as servers. In FIG. 6, the game server 604, monitoring unit 606 and cloud game client 608 are shown as being contained within a cloud icon. The cloud icon is intended to represent the game server 604, monitoring unit 606 and cloud game client 608 as corresponding to a cloud gaming service. The cloud gaming service enables each client device to participate in a video game session, wherein at least some of the rendering of respective video game instances can be performed remotely. However, it will be appreciated that optionally the cloud gaming service may be separate to the game server, and may for example provide rendering assistance to client devices for multiple game titles having their own respective game servers.

In FIG. 6, the game server 604 is shown as providing an input to the cloud game client 608 in the form of 'game client traffic'. The game client traffic may correspond to the game state information for the identified client devices 602—i.e. the information needed to render a video game instance for a given player. Thus, the game server 604 may be configured to route the obtained game state information to the cloud game client, in response to the input received from the monitoring unit 606.

In FIG. 6, the player inputs are shown as being routed directly from the game clients 602 to the cloud game client 608. This may be more preferable than sending the player inputs to the cloud game client 608 via the game server 604, since any delay introduced by the processing of the inputs at the game server 604 will be avoided. In such examples, it may be that the obtained game state information is used to render a view of the virtual environment based on the actions of other players, with the player inputs received from a given client device being used to adjust the view for that player. Once rendered, the view may be sent back to the game client 602, via the game server 604.

In FIG. 6, the cloud game client 608 is also shown as receiving an input ('control CGC instance') from the monitoring unit 606. The input received from the monitoring unit 606 may be used to control whether or not a video game instance is rendered at the cloud game client. For example, the monitoring unit 606 may be configured to determine, based on updated game state information, that the quality of the video game instances rendered at the one or more identified client devices 602 will no longer be less than the threshold quality. In response to this determination, the games unit may be configured to cause the cloud game client 608 to no longer render the video game instances for the one or more identified client devices 602. The input received from the monitoring unit 606 at the cloud game client 608 may thus be used to instruct the cloud game client 608 as to which client devices 602 are to have their respective video game instances rendered by the cloud game client.

In some examples, it may be that multiple instances of the cloud game client 608 are installed at one or more cloud devices, with each cloud game client 608 serving different players or groups of players. The monitoring unit 606 may be used to control which cloud game client 608 instances are used by the different players. For example, in response to detecting that the game requirements for a given player has lowered to the point that the local device can or is likely to be able render at the full framerate (e.g. 60 fps), the monitoring unit 606 may instruct the corresponding cloud game client 608 instance to cease rendering the video game instance for that player. This may result in the cloud game client 608 instance being returned to the pool of available cloud game client 608 instances, for use by another game client, as requested by the monitoring unit 606. In some examples, the cloud game client 608 instance may be re-allocated to a different client device (for which the e.g. GPU requirements are still expected to exceed the capabilities of the local device).

The system 600 further comprises an output unit (not shown) operable to transmit video game instances rendered by the cloud game client 608 to corresponding identified client devices 602. The output unit may form part of the one or more cloud devices at which the cloud game client 608 is implemented. The player inputs and game state information received at the cloud game client 608 may be provided along with a client device identifier (e.g. IP address) that enables to the renderings generated by the cloud game client 608 to be transmitted to the corresponding respective client devices 602. As shown in FIG. 6, the output of the cloud game client 608 may correspond to video streams for display at (or via) the client devices 602 identified by the monitoring unit 606. In FIG. 6, the cloud game client 608 is shown as providing an output in the form of a 'game video stream'. The video streams correspond to respective player's view of the virtual environment.

The client devices 602 may be operable to control whether the video game instances rendered locally or remotely are output for display at an associated display. In some examples, the client devices 602 may be configured to cease rendering video game instances locally in response to receiving a video game instance that has been rendered remotely. The client devices 602 may also be configured to revert to local rendering, in response to an input or lack of input received from the cloud game client.

In additional or alternative examples, the monitoring unit 606 may be operable to instruct the client devices 602 to cease or revert back to rendering video game instances locally. For example, the client device 602 may be configured to operate in a first mode, wherein in the first mode the client device 602 runs a video game instance and sends client generated game state data and user inputs to a server, and receives updated game state data upon which to base rendering of the video game instance. The client device 602 may be operable to receive a signal indicating that it is to switch to a second mode without interruption, wherein in the second mode the rendering of the same game instance is performed by a remote cloud server and the resulting image is transmitted to the client device for display. That is, in the second mode, the client device is configured to display or cause to be displayed, video received from the remote cloud server. As described previously, the client device may correspond to an entertainment device, such as e.g. a games console, portable games console, smartphone, tablet, etc. It will be further appreciated that the entertainment device (client device) may operate in any of the manners described previously in relation to FIGS. 5 and 6.

Whilst the above system has been described in relation to client devices operable to connect to one or more servers forming a cloud gaming service, it will be appreciated that in some examples, the cloud gaming service may be formed of a peer-to-peer network of remote client devices connected to one another and a local client device, via a communications network. In such embodiments, the functionality of the monitoring unit and/or the cloud-based rendering may be performed at the remote client devices forming part of the P2P cloud gaming network, with the client device being operable to switch between the first and second modes based on information (and possibly, renders) received from one or remote client devices.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of controlling the rendering of a video game instance, the method comprising:
   obtaining game state information and player inputs from a plurality of client devices participating in a video game session, each client device being associated with a respective participant of the video game session;
   identifying, based on the obtained game state information, a client device that locally renders a video game instance as having or being likely to render the video game instance with a quality that is less than a threshold quality;
   allocating a cloud game client to the identified client device;
   providing the player inputs received from the identified client device and the obtained game state information to the allocated cloud game client;
   rendering at the cloud game client, based on the obtained game state information and player inputs, the video game instance that has or is expected to drop below the threshold quality, and transmitting the video game instance rendered by the cloud game client to the identified client device for display at an associated display.

2. A method according to claim 1, wherein the obtained game state information provides an indication of a density of players concurrently occupying or likely to occupy a region of a virtual environment that is accessible to each participant of the video game session, the obtained game state information comprising at least one of:
   i. a state of the respective player participating in the video game session; and
   ii. a state of the virtual environment.

3. A method according to claim 1, wherein the cloud game client is implemented at one or more cloud devices forming a cloud gaming service, the cloud game client corresponding to a duplicate of a video game client implemented at the respective client devices.

4. A method according to claim 1, wherein the cloud game client is a duplicate of a video game client implemented at the client devices; and wherein rendering the video game instance at the cloud game client comprises generating a video stream corresponding to a view of the virtual environment for the participant associated with the identified client device.

5. A method according to claim 1, comprising:
   ceasing rendering the video game instance at the identified client device; and
   providing the player inputs received from the identified client device to the cloud game client, such that the cloud game client renders the video game instance instead of the client device.

6. A method according to claim 1, further comprising:
   obtaining updated game state information;
   determining, based on the updated game state information, that rendering the video game instance at the identified client device will no longer result in a quality that is less than the threshold quality, and in response thereto, instructing the cloud game client to no longer render the video game instance for the identified client device.

7. A method according to claim 1, comprising:
   identifying, based on the obtained game state information, a plurality of client devices as having or being likely to render video game instances with a quality that is less than threshold quality;
   allocating cloud game clients to the identified client devices, each client device being allocated a different respective cloud game client;
   providing the player inputs and game state information for each participant to the corresponding allocated cloud game client instance;
   rendering the video game instances at the cloud game clients instances, and transmitting the video game instances rendered at the cloud game client instances to the corresponding client devices.

8. A non-transitory, computer readable medium having computer executable instructions stored thereon, which when executed by a computer system, cause the computer system to control rendering of a video game instance by carry out actions, comprising:
   obtaining game state information and player inputs from a plurality of client devices participating in a video game session, each client device being associated with a respective participant of the video game session;
   identifying, based on the obtained game state information, a client device that locally renders a video game instance as having or being likely to render the video game instance with a quality that is less than a threshold quality;
   allocating a cloud game client to the identified client device;
   providing the player inputs received from the identified client device and the obtained game state information to the allocated cloud game client;
   rendering at the cloud game client, based on the obtained game state information and player inputs, the video game instance that has or is expected to drop below the threshold quality, and transmitting the video game instance rendered by the cloud game client to the identified client device for display at an associated display.

9. A cloud gaming system, comprising:
a games unit operable to obtain game state information and player inputs from a plurality of client devices participating in a video game session, the games unit being operable to generate a virtual environment accessible by multiple concurrent players participating in the video game session;
a monitoring unit operable to receive game state information for the video game session and identify one or more client devices that locally render video game instances as being likely to render the video game instances with a quality that is less than a threshold quality based on the received game state information;
wherein the games unit is configured to receive an input from the monitoring unit, and in response thereto, cause the game state information and player inputs to be provided to a cloud game client;
a cloud game client operable to render video game instances for the one or more identified client devices based on the game state information and player inputs; and
an output unit operable to transmit the video game instances rendered at the cloud game client to the corresponding client devices for display at respective displays associated with the client devices.

10. A cloud gaming system according to claim 9, wherein the game state information provides an indication of a density of players concurrently occupying or likely to occupy a region of the virtual environment, the game state information comprising at least one of:
  i. a status of the players participating in the video game session;
  ii. a status of the virtual environment.

11. A cloud gaming system according to claim 9, wherein the cloud game client corresponds to a duplicate of a video game client implemented at the client devices; and
wherein the cloud game client is operable to generate a video output for each identified client device, each video output corresponding to a respective view of the virtual environment for the player associated with that client device.

12. A cloud gaming system according to claim 9, wherein the monitoring unit is operable to instruct the one or more client devices to transmit player inputs directly to the cloud game client.

13. A cloud gaming system according to claim 9, wherein the cloud game client is implemented at one or more cloud devices have greater CPU and or GPU resources available for rendering the video game instances than the corresponding identified client devices.

14. A cloud gaming system according to claim 9, wherein the monitoring unit is configured to receive updated game state information from the games unit and in response thereto, determine that the quality of the video game instances rendered at the one or more identified client devices will no longer be less than the threshold quality; and wherein the games unit is operable to cause the cloud game client to no longer render the video game instances for the one or more identified client devices.

15. A cloud gaming system according to claim 9, further comprising:
  a plurality of client devices, each client device being operable to render a respective video game instance; and
  wherein each client device is configured to receive an input from the cloud game client, and in response thereto, determine whether the video game instance rendered at the cloud game client or a video game instance rendered at the client device is to be displayed at an associated display.

16. An entertainment device for playing video games, the entertainment device being operable to connect to a cloud gaming service via a communications network;
  wherein the entertainment device is configured to operate in a first mode, wherein in the first mode the entertainment device runs a video game instance and sends client generated game state data and user inputs to a server, and receives updated game state data upon which to base rendering of the video game instance; and
  wherein the entertainment device is operable receive a signal indicating that it is to switch to a second mode without interruption, wherein in the second mode the rendering of the same game instance is performed by a remote cloud server of the cloud gaming service, and the resulting image is transmitted to the entertainment device for display.

* * * * *